(12) United States Patent
Cho et al.

(10) Patent No.: US 7,792,022 B2
(45) Date of Patent: Sep. 7, 2010

(54) METHOD AND APPARATUS FOR DE-RATE MATCHING IN COMMUNICATION SYSTEM

(75) Inventors: Dae-Soon Cho, Daejeon (KR);
Tae-Joong Kim, Seongnam-si (KR);
Young-Sup Kim, Daejeon (KR);
Hyeong-Jun Park, Daejeon (KR)

(73) Assignees: Electronics and Telecommunications Research Institute, Daejeon (KR);
Samsung Electronics and Co., Ltd., Suwon-Si, Gyeonggi-Do (KR)

( * ) Notice: Subject to any disclaimer, the term of this patent is extended or adjusted under 35 U.S.C. 154(b) by 346 days.

(21) Appl. No.: 11/837,019

(22) Filed: Aug. 10, 2007

(65) Prior Publication Data
US 2008/0130510 A1 Jun. 5, 2008

(30) Foreign Application Priority Data
Dec. 1, 2006 (KR) .................. 10-2006-0120767
Mar. 13, 2007 (KR) .................. 10-2007-0024394

(51) Int. Cl.
*H03M 13/00* (2006.01)
(52) U.S. Cl. .............. 370/229; 714/776; 375/147; 709/230; 709/232; 709/233; 709/234
(58) Field of Classification Search ......... 370/229–236; 709/230, 232–234; 714/776; 375/147
See application file for complete search history.

(56) References Cited

U.S. PATENT DOCUMENTS 6,397,367 B1 * 5/2002 Park et al. .................. 714/786
6,798,826 B1 * 9/2004 Shiu et al. .................. 375/147
6,907,009 B2 6/2005 Maruwaka et al.
7,409,656 B1 * 8/2008 Ruehl ............................. 716/5
2003/0072292 A1 4/2003 Yoon et al.
2003/0095532 A1 5/2003 Kim et al.
2005/0172201 A1 * 8/2005 Kutz et al. .................. 714/755
2005/0201283 A1 9/2005 Yoon et al.
2007/0255994 A1 * 11/2007 Michel et al. ............... 714/751

FOREIGN PATENT DOCUMENTS

| GB | 2340353 | 2/2000 |
|----|---------|--------|
| KR | 1020010018890 | 3/2001 |
| KR | 10-2003-0032381 | 4/2003 |
| KR | 10-2003-0041728 | 5/2003 |
| KR | 10-2003-0091243 | 12/2003 |
| KR | 100419690 | 2/2004 |

(Continued)

OTHER PUBLICATIONS

Notice of Allowance dated Feb. 20, 2009, for Korean application No. 10-2007-0024394.

(Continued)

*Primary Examiner*—William Trost, IV
*Assistant Examiner*—Ashil Farahmand
(74) *Attorney, Agent, or Firm*—Lowe Hauptman Ham & Berner LLP

(57) ABSTRACT

A de-rate matching device in a communication system divides received data into a plurality of blocks, and simultaneously de-rate-matches data in the respective blocks.

17 Claims, 4 Drawing Sheets

FOREIGN PATENT DOCUMENTS

| | | |
|---|---|---|
| KR | 10-2005-0087892 | 9/2005 |
| KR | 1020050087892 | 9/2005 |
| KR | 1020050106942 | 11/2005 |
| KR | 10-0556448 | 2/2006 |
| KR | 1020060091835 | 8/2006 |
| KR | 10-2007-0057369 | 6/2007 |

OTHER PUBLICATIONS

Office action for Korean app. 10-2007-0024394.

* cited by examiner

METHOD AND APPARATUS FOR DE-RATE MATCHING IN COMMUNICATION SYSTEM

CROSS-REFERENCE TO RELATED APPLICATION

This application claims priority to and the benefit of Korean Patent Application No. 10-2006-0120767 filed in the Korean Intellectual Property Office on Dec. 1, 2006, and No. 10-2007-0024394 filed in the Korean Intellectual Property Office on Mar. 13, 2007, the entire contents of which are incorporated herein by reference.

BACKGROUND OF THE INVENTION (a) Field of the Invention

The present invention relates to a de-rate matching device and a method thereof.

This work was supported by the IT R&D program of MIC [2005-S-404-12, Research & Development of Radio Transmission Technology for 3G evolution].

(b) Description of the Related Art

A transmitting terminal of a mobile communication system performs a rate matching operation, and a receiving terminal of the mobile communication system performs a de-rate matching operation. In the rate matching operation, the number of bits encoded by a repetition or puncturing operation is adjusted to correspond to the number of bits required to be transmitted to the network according to a rate matching pattern before the number of encoded bits is transmitted to a network. In the de-rate matching operation, a rate matching state is de-rated before the receiving terminal of the mobile communication system decodes received data processed by the repetition or puncturing operation. A de-rate matching algorithm for de-rating the rate matching state from a first bit to a last bit of the data received from the network is applied in a de-rate matching device that performs the de-rate matching operation. In this case, it is required to provide clock signals corresponding to the number of received data. However, when the data rate is increased and the number of input data is increased in one transmission time interval (TTI), the size of the input data may become greater than the number of clock signals corresponding to the TTI. In this case, there are problems in that the de-rate matching algorithm with one process may not be applied to the input data, and a de-rate matching time is increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a de-rate matching device for reducing a de-rate matching time in a mobile communication system, and a method thereof.

In an exemplary de-rate matching method according to an embodiment of the present invention, received data are divided into a plurality of blocks, and the data in the respective blocks are de-rate matched and the data are output.

An exemplary de-rate matching device according to an embodiment of the present invention includes a data dividing unit, a plurality of de-rate matching units, and a data combining unit. The data dividing unit divides received data into a plurality of blocks and outputs data included in the respective blocks. The plurality of de-rate matching units de-rate match the output data included in the respective blocks, and output the de-rate matched data corresponding to the respective blocks. The data combining unit combines the plurality of de-rate matched data to generate one data.

In an exemplary de-rate matching method according to another exemplary embodiment of the present invention, received data are divided into a plurality of blocks, an initial error value of an $i^{th}$ block is determined from an initial error value of an $(i-1)^{th}$ block and the number of bits of data that are not original data of the $(i-1)^{th}$ block, the number of bits of the data that are not original data of the $i^{th}$ block is determined from the initial error value of the $i^{th}$ block, an address value of an $(i-1)^{th}$ block is determined from the number of bits of the data that are not original data of the respective blocks from first to $i^{th}$ block, and a de-rate matching operation is performed for the address value of a determined $(i+1)^{th}$ block and the data of the $(i+1)^{th}$ block (here, i is an integer).

DETAILED DESCRIPTION OF THE EMBODIMENTS

Figure 1:
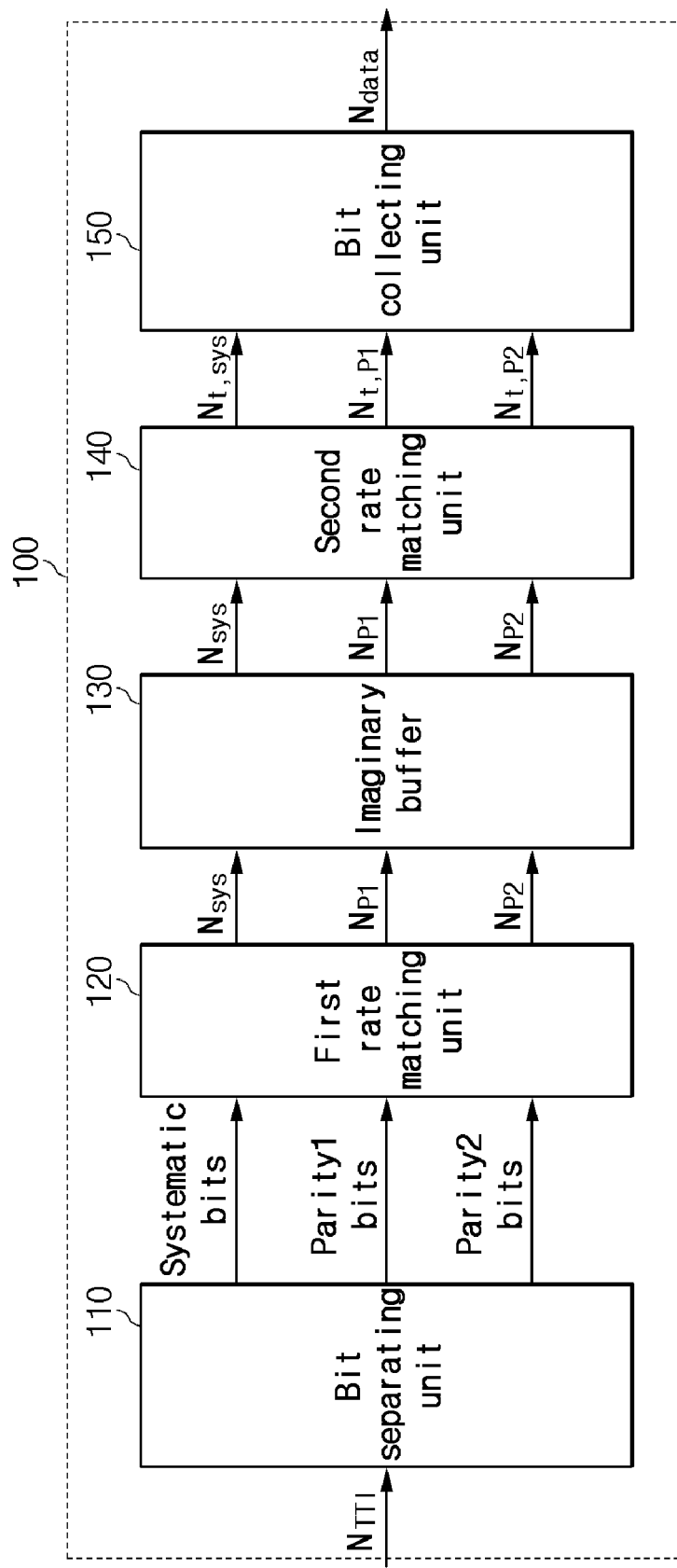
FIG. 1 is a schematic diagram of a rate matching device in a transmitting terminal of a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprise", and variations such as "comprises" or "comprising" will be understood to imply the inclusion of stated elements but not the exclusion of any other elements. In addition, the word "block" will be understood to indicate a unit for processing a predetermined function or operation, which may be realized by hardware, software, or a combination thereof.

A de-rate matching device in a mobile communication system according to an exemplary embodiment of the present invention and a method thereof will be described with reference to the figures. In the exemplary embodiment of the present invention, while a $3^{rd}$ generation evolution (3GE) mobile communication system is exemplified, another mobile communication system may be used.

FIG. 1 is a schematic diagram of a rate matching device in a transmitting terminal of a mobile communication system according to the exemplary embodiment of the present invention.

As shown in FIG. 1, the rate matching device 100 includes a bit separating unit 110, a first rate matching unit 120, an imaginary buffer 130, a second rate matching unit 140, and a bit collecting unit 150.

The bit separating unit 110 separates an input signal $N_{TTI}$ including encoded bits into information bits (systematic bits) and first and second parity bits (Parity 1 bits and Parity 2 bits), and outputs them to the first matching unit 120.

The first rate matching unit 120 performs the rate matching operation for the received information bits and the first and second parity bits to output them ($N_{sys}$, $N_{p1}$, and $N_{p2}$) to the imaginary buffer 130. In this case, the first rate matching unit 120 uses a rate matching algorithm to perform a puncturing or repetition operation for the rate matching operation for the first and second parity bits according to a predetermined rate matching pattern, excepting the information bit.

The imaginary buffer 130 stores the information bits $N_{sys}$ output from the first matching unit 120 and the rate matched first and second parity bits $N_{p1}$ and $N_{p2}$.

The second rate matching unit 140 uses the rate matching algorithm to perform the rate matching operation for the information bits $N_{sys}$ and the first and second parity bits $N_{p1}$ and $N_{p2}$ output from the imaginary buffer 130 according to the predetermined rate matching pattern so that a size of data obtained by adding the information bit $N_{sys}$ and the first and second parity bits $N_{p1}$ and $N_{p2}$ may be a number of bits that may be transmitted in a physical channel of a network.

The bit collecting unit 150 adds the rate matched bits output from the second rate matching unit 140 and interleaves them. In this case, the interleaved data are modulated to be output to the network. In addition, a receiving terminal receives the modulated data from the network, and de-interleaves the received data to output them to a de-rate matching device.

Figure 2:
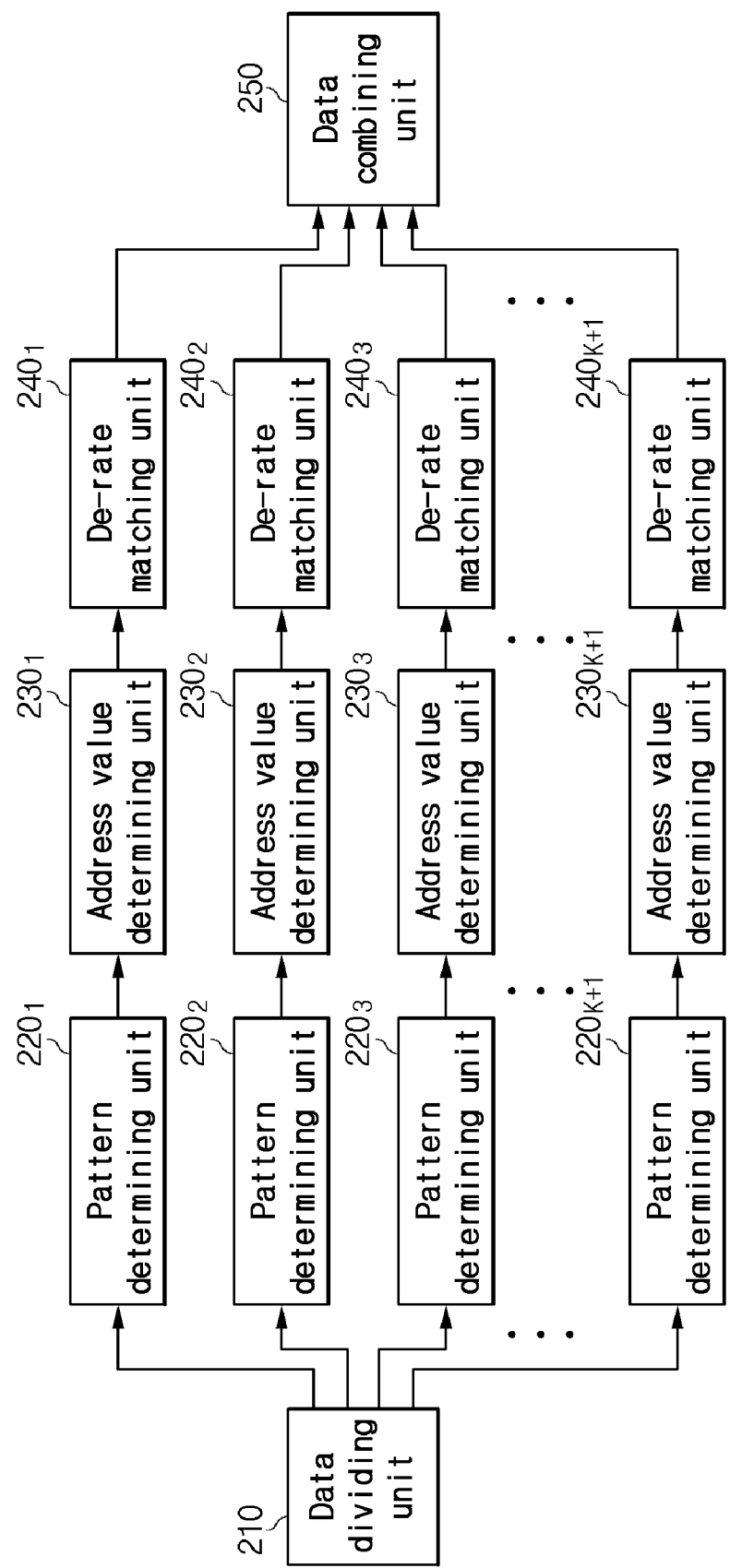
FIG. 2 is a schematic diagram of a de-rate matching device in a receiving terminal of the mobile communication system according to the exemplary embodiment of the present invention.
Figure 3:
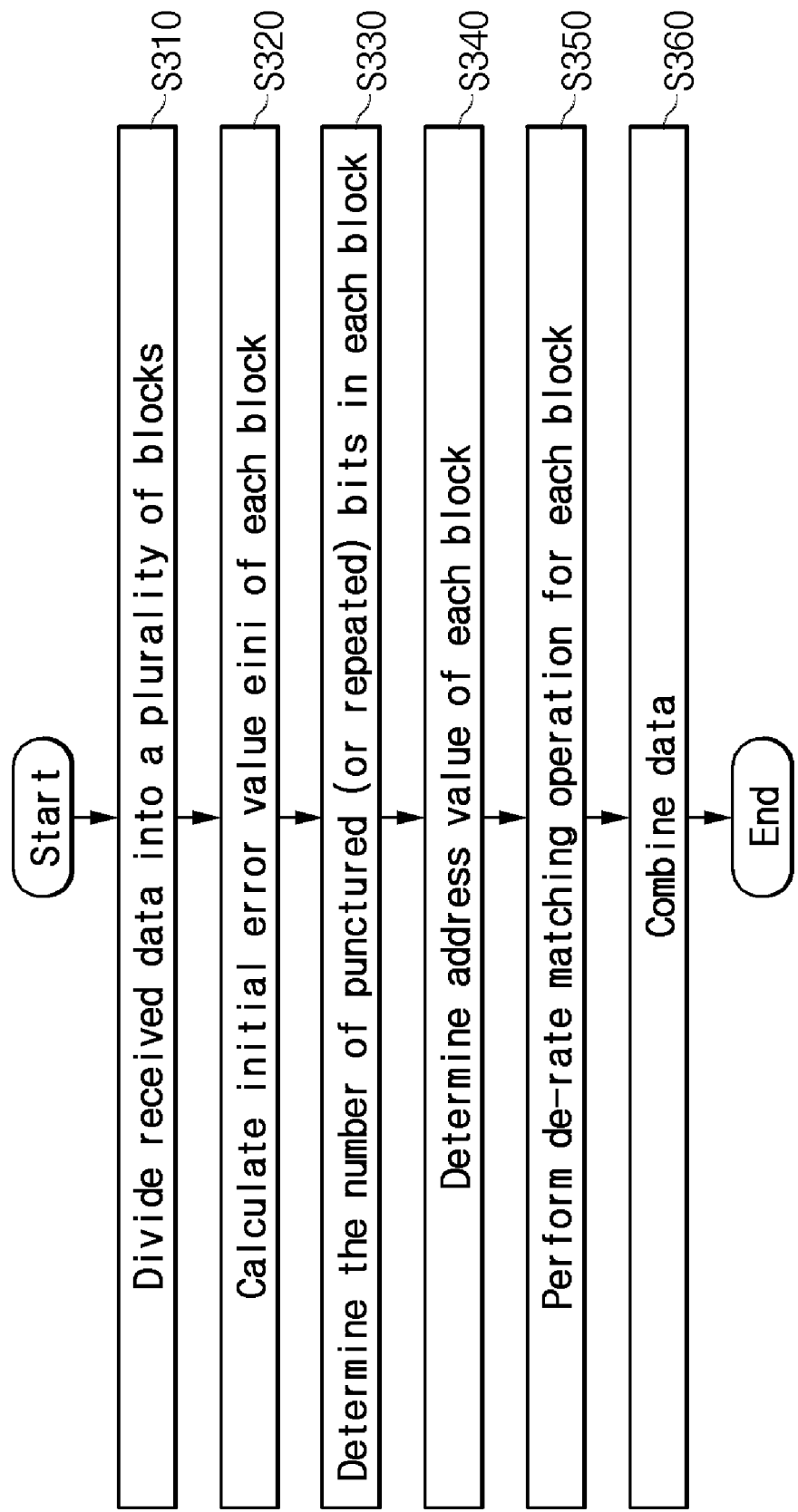
FIG. 3 is a diagram representing an operation of the de-rate matching device according to the exemplary embodiment of the present invention.
Figure 4:
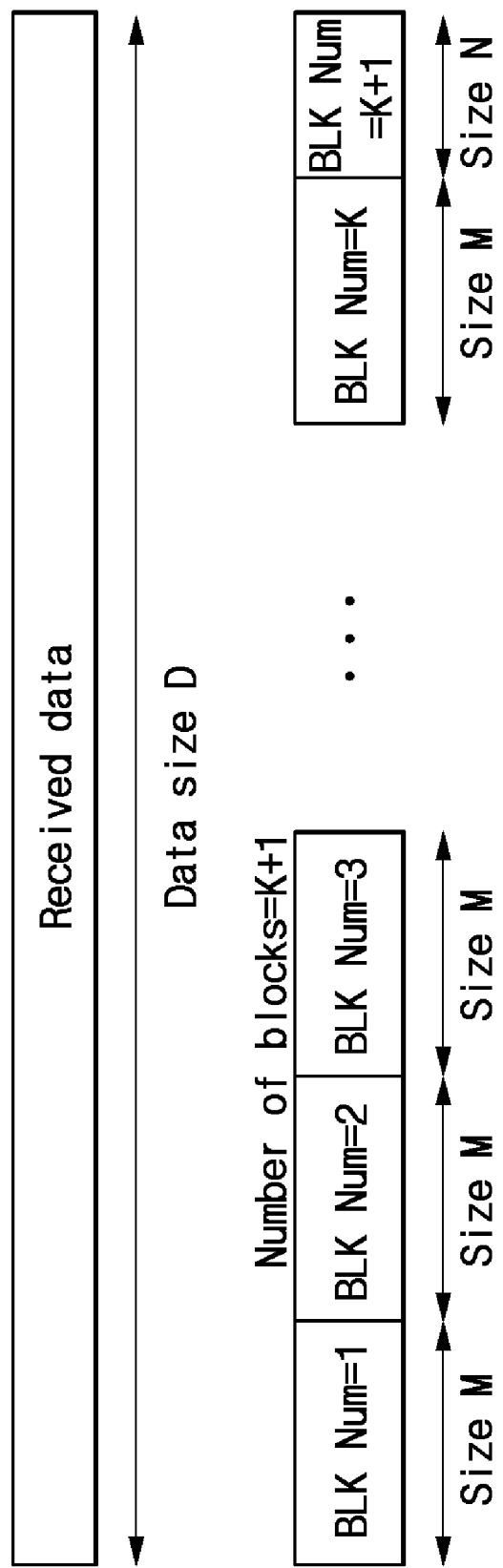
FIG. 4 is a diagram of a configuration of received data divided into a plurality of blocks by a data dividing unit shown in FIG. 2.

FIG. 2 is a schematic diagram of a de-rate matching device in the receiving terminal of the mobile communication system according to the exemplary embodiment of the present invention, and FIG. 3 is a diagram representing an operation of the de-rate matching device according to the exemplary embodiment of the present invention. FIG. 4 is a diagram of a configuration of received data divided into a plurality of blocks by a data dividing unit shown in FIG. 2.

As shown in FIG. 2 and FIG. 3, a de-rate matching device 200 according to the exemplary embodiment of the present invention includes a data dividing unit 210, a plurality of pattern determining units $220_1$, $220_2$, $220_3$, . . . , and $220_{k+1}$, a plurality of address value determining units $230_1$, $230_2$, $230_3$, . . . , and $230_{k+1}$, a plurality of de-rate matching units $240_1$, $240_2$, $240_3$, . . . , and $240_{k+1}$, and a data combining unit 250.

The data dividing unit 210 divides received data into a plurality of blocks in step S310, and transmits the data corresponding to the respective blocks to the respective pattern determining units $220_1$, $220_2$, $220_3$, . . . , and $220_{k+1}$ corresponding to the respective blocks. In this case, as shown in FIG. 4, the received data having a number D of bits may be divided into (k+1) blocks (BLK Num=1, BLK Num=2, BLK Num=3, . . . , BLK Num=k, and BLK Num=k+1). Here, the number of bits of data for first to $k^{th}$ blocks (BLK Num=1, BLK Num=2, BLK Num=3, . . . , and BLK Num=k) is M, and the number of bits of data for the last $(k+1)^{th}$ block (BLK Num=k+1) is a number obtained by subtracting (k*M) from the bit number D of the received data. In addition, the number of blocks is equal to the respective numbers of the plurality of pattern determining units $220_1$, $220_2$, $220_3$, . . . , and $220_{k+1}$, the plurality of address value determining units $230_1$, $230_2$, $230_3$, . . . , and $230_{k+1}$, and the plurality of de-rate matching units $240_1$, $240_2$, $240_3$, . . . , and $240_{k+1}$, and the plurality of pattern determining units $220_1$, $220_2$, $220_3$, . . . , and $220_{k+1}$, the plurality of address value determining units $230_1$, $230_2$, $230_3$, . . . , and $230_{k+1}$, and the plurality of de-rate matching units $240_1$, $240_2$, $240_3$, . . . , and $240_{k+1}$ respectively correspond to the plurality of blocks BLK Num=1, BLK Num=2, BLK Num=3, . . . , BLK Num=k, and BLK Num=k+1.

The respective pattern determining units $220_1$, $220_2$, $220_3$, . . . , and $220_{k+1}$ calculate an initial error value $e_{ini}$ for obtaining a rate matching pattern applied to the data of the corresponding block in step S320, and determines the number (deltaN) of punctured (or repeated) bits in the data of the respective blocks from the calculated initial error value $e_{ini}$ and a rate matching parameter used in the rate matching device in step S330. Here, the number of punctured (or repeated) bits is the number of bits of data that are not original data to be transmitted. The respective pattern determining units $220_1$, $220_2$, $220_3$, . . . , and $220_{k+1}$ use the following parameter detection algorithm to obtain the initial error value of the respective blocks and the number of punctured (or repeated) bits. In this case, $e_{plus}$, $e_{minus}$, and $e_{ini}$ are given at a former position.

<Parameter detection algorithm>

```
M = floor(Nout/k);
e_ini[0] = e_ini;
deltaN[0] = floor(e_minus*M / e_plus) + ((e_ini[0]< e_minus)? 1:0);
for (i=1; i<k; i++)
{
    e_ini[i] = e_ini[i-1] – M* e_minus + deltaN[i-1]* e_plus;
    deltaN[i] = floor(e_minus*M / e_plus) + ((e_ini[i]< e_minus)? 1:0);
}
e_ini[k] = e_ini[k-1] – M* e_minus + deltaN[k-1]* e_plus;
return e_ini[0:k];
```

Here, Nout denotes a length of the received data, k denotes the number of blocks except for the last block, and M denotes a size of data. In this case, the size of the data of the last (i.e., the $(k+1)^{th}$ block) may not be M. In addition, when (Nout/k) is an integer, the data of the last block BLK Num=k+1 is 0. $e_{ini}[i]$ denotes an initial error value of the $(i+1)^{th}$ block, and deltaN[i] denotes the number of punctured (or repeated) bits of an $(i+1)^{th}$ block ($0 \leq i \leq k-1$). $e_{plus}$ and $e_{minus}$ respectively denote rate matching parameters used in the rate matching device, $e_{plus}$ is an increase value of an error value e used to calculate the rate matching pattern, and $e_{minus}$ is a decrease value of the error value e used to calculate the rate matching pattern.

The respective address value determining units $230_1$, $230_2$, $230_3$, . . . , and $230_{k+1}$ determine an address value of the respective blocks in step S340 from the number of punctured (or repeated) bits determined by the corresponding pattern determining units $220_1$, $220_2$, $220_3$, . . . , and $220_{k+1}$. For example, the sizes of k blocks are respectively M, and when the number of punctured (or repeated) bits in the first block is deltaN[0], the address value of the second block is a value obtained by subtracting the number of punctured (or repeated) bits in the first block from the number M of the bits of the block (=M*1−(deltaN[0])). In addition, the address value of the third block is obtained by subtracting the number of punctured (or repeated) bits in the first and second blocks from the number of bits of the first and second blocks (=M*2−(deltaN[0]+deltaN[1])). Accordingly, the address values of the respective blocks are given as Equation 1.

Address value of $N^{th}$ block = (Equation 1)

$$M*(N-1) - \left(\sum_{i=1}^{N} deltaN[i-1]\right)$$

The respective de-rate matching units $240_1$, $240_2$, $240_3$, ..., and $240_{k+1}$ use the address value determined by the address value determining units $230_1$, $230_2$, $230_3$, ..., and $230_{k+1}$ corresponding to the initial error value $e_{ini}$ determined by the corresponding pattern determining units $220_1$, $220_2$, $220_3$, ..., and $220_{k+1}$ to de-rate match the data of the block in step S350. In this case, the respective de-rate matching units $240_1$, $240_2$, $240_3$, ..., and $240_{k+1}$ may use a de-rate matching algorithm as follows.

<De-rate matching algorithm>

```
if puncturing is to be performed
    e=e_ini     -- initial error between current puncturing rate and
                   desired puncturing rate
    m=1         -- Index of current bit
    do while m<=X_i
        e=e-e_minus   -- Update error
        if e<= 0 then  -- Determine whether puncturing occurs in index m
            set bit x_{i,m} to δ ∉ {0,1}
            e=e+e_plus   -- Update error
        end if
        m=m+1   -- Next bit
    end do
else
    e=e_ini     -- initial error between current puncturing rate and
                   desired puncturing rate
    m=1         -- Index of current bit
    do while m<=X_i
        e=e-e_minus   -- Update error
        do while e<=0   -- Determine whether index m is repeatedly
                           generated
            repeat bit x_{i,m}
            e=e+ e_plus  -- Update error
        end do
        m=m+1       --Next bit
    end do
end if
    Repeated bit is positioned to be immediately subsequent to original
    bit.
```

The data combining unit 250 combines the data de-rate matched by the respective de-rate matching units $240_1$, $240_2$, $240_3$, ..., and $240_{k+1}$, and outputs them in step S360. As described, a channel decoding operation is performed for the output data.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, when the size of received data is large, the received data are divided into a plurality of blocks, the respective blocks performs simultaneously the de-rate matching operation, and therefore the de-rate matching time is reduced.

What is claimed is:

1. A de-rate matching method implemented by a de-rate matching device in a communication system, said method comprising:
    dividing received data into a plurality of blocks;
    determining initial error values of the respective blocks;
    calculating the number of bits that are not original data in each block from the initial error value of each block;
    determining address values of the respective blocks, wherein the address value of an $i^{th}$ block is determined from a total number of bits that are not the original data of the respective blocks from the first block to the $(i-1)^{th}$ block and a total number of bits of the first block through the $(i-1)^{th}$ block; and
    simultaneously de-rate matching the data in the respective blocks by using the initial error values and the address values.

2. The de-rate matching method of claim 1, wherein
    the address value of an $i^{th}$ block is determined by subtracting the total number of bits that are not the original data of the respective blocks from the first block to the $(i-1)^{th}$ block from the total number of bits of the first block through the $(i-1)^{th}$ block.

3. The de-rate matching method of claim 1, wherein
    the initial error value of the $i^{th}$ block is determined by a plurality of rate matching parameters, the initial error value of the $(i-1)^{th}$ block, the number of bits that are not the original data of the $(i-1)^{th}$ block, and the number of bits of the $i^{th}$ block.

4. The de-rate matching method of claim 3, wherein
    the number of bits that are not the original data of the $i^{th}$ block is determined by the rate matching parameters and the initial error value of the $i^{th}$ block.

5. The de-rate matching method of claim 4, wherein
    the number of bits of original data of the $i^{th}$ block is determined by the rate matching parameters, the initial error value of the $i^{th}$ block, and the number of bits of the $i^{th}$ block.

6. The de-rate matching method of claim 1, further comprising
    combining de-rate matched data that are output for each block and outputting the combined data.

7. A de-rate matching device comprising:
    a data dividing unit for dividing received data into a plurality of blocks and outputting data included in the respective blocks;
    a plurality of de-rate matching units for de-rate matching the output data included in the respective blocks, and outputting the de-rate matched data corresponding to the respective blocks; and
    a data combining unit for combining the plurality of de-rate matched data to generate one data;
    wherein the data dividing unit is configured to divide the received data into a first block through a $(k+1)^{th}$ block, and
    wherein the de-rate matching device further comprises:
    (k+1) pattern determining units coupled to the data dividing unit to receive the first through $(k+1)^{th}$ blocks, respectively, for determining initial error values of the respective blocks; and
    (k+1) address value determining units coupled to the first through $(k+1)^{th}$ pattern determining units, respectively, to receive the initial error values of the respective blocks for determining address values of the respective blocks;

wherein the address value determining units are configured to determine the address value of the $i^{th}$ block from a total number of bits that are not the original data of the first block through the $(i-1)^{th}$ block and a total number of bits of the first block through the $(i-1)^{th}$ block.

8. The de-rate matching device of claim 7, wherein:
the pattern determining units are configured for determining the initial error values of the respective blocks from (i) a plurality of rate matching parameters applied at a transmitting side to the data and (ii) the number of bits of the respective blocks; and
the address value determining units are configured for determining the address values of the respective blocks from the number of bits of the respective blocks,
wherein each of the de-rate matching units respectively uses the initial error value and the address value of the corresponding block.

9. The de-rate matching device of claim 8, wherein
the pattern determining units are configured to calculate the number of bits that are not original data of the respective blocks from the initial error values of the respective blocks and the rate matching parameters, and
the address value determining units are configured to respectively determine the address values of the respective blocks from the number of bits of the respective blocks and the number of bits that are not the original data of the respective blocks.

10. The de-rate matching device of claim 7, wherein
an initial error value of an $i^{th}$ block is determined from an initial error value of an $(i-1)^{th}$ block and the number of bits that are not original data of the $(i-1)^{th}$ block;
the number of bits that are not the original data of the $i^{th}$ block is determined from the initial error value of the $i^{th}$ block; and
the address value of the $i^{th}$ block is determined from the number of bits that are not the original data of the first block through the $(i-1)^{th}$ block;
wherein
said de-rate matching device comprises (k+1) de-rate matching units coupled to the first through $(k+1)^{th}$ address value determining units, respectively, to receive and use the address values and the initial error values of the respective blocks for de-rate matching the output data included in the respective blocks; and
i and k are integers and $1 \leq i \leq (k+1)$.

11. The de-rate matching device of claim 10, wherein
the address value determining units are configured to determine the address value of the $i^{th}$ block by subtracting the total number of bits that are not the original data of the first block through the $(i-1)^{th}$ block from the total number of bits of the first block through the $(i-1)^{th}$ block.

12. The de-rate matching device of claim 11, wherein
the pattern determining units are configured to determine the initial error value of the $i^{th}$ block from
a plurality of rate matching parameters,
the initial error value of the $(i-1)^{th}$ block,
the number of bits that are not the original data of the $(i-1)^{th}$ block, and
the number of bits of the $i^{th}$ block.

13. The de-rate matching device of claim 12, wherein
the pattern determining units are configured to determine the number of bits that are not the original data of the $i^{th}$ block from
the rate matching parameters, and
the initial error value of the ith block.

14. A de-rate matching method implemented by a de-rate matching device in a communication system, said method comprising:
dividing received data into a plurality of blocks including a first block to a $(k+1)^{th}$ block;
determining initial error values of the respective blocks, wherein
an initial error value of an $i^{th}$ block is determined from an initial error value of an $(i-1)^{th}$ block and the number of bits that are not original data of the $(i-1)^{th}$ block and
the number of bits that are not the original data of the $i^{th}$ block is determined from the initial error value of the $i^{th}$ block;
determining address values of the respective blocks, wherein an address value of the $i^{th}$ block is determined from the number of bits that are not the original data of the first block through the $(i-1)^{th}$ block; and
performing a de-rate matching operation on the respective blocks using the respective address values;
wherein i and k are integers and $1 \leq i \leq (k+1)$.

15. The de-rate matching method of claim 14, further comprising
receiving an initial error value of the first block.

16. The de-rate matching method of claim 15, further comprising
receiving a plurality of rate matching parameters, and
using the received rate matching parameters to determine the initial error value and the number of bits that are not the original data of the respective blocks.

17. The de-rate matching of claim 15, further comprising combining de-rate matched data from the first block to the $(k+1)^{th}$ block.

* * * * *